United States Patent [19]
Buhler et al.

[11] Patent Number: 5,192,565
[45] Date of Patent: Mar. 9, 1993

[54] PRESERVATION OF VEGETABLES AND FRUITS

[75] Inventors: Marcel Buhler, Tolochenaz; Thang Ho Dac, Le Mont-s/Lausanne; Hugh Hose, Yverdon; Robert D. Wood, Lausanne, all of Switzerland

[73] Assignee: Nestec S.A., Vevey, Switzerland

[21] Appl. No.: 756,816

[22] Filed: Sep. 9, 1991

[30] Foreign Application Priority Data

Sep. 28, 1990 [CH] Switzerland ............... 3130/90-2

[51] Int. Cl.$^5$ .............................. A23B 7/10
[52] U.S. Cl. ............................ 426/49; 426/8; 426/52
[58] Field of Search ................ 426/49, 52, 7, 8

[56] References Cited

U.S. PATENT DOCUMENTS

| | | |
|---|---|---|
| 3,403,032 | 9/1968 | Etchelk et al. |
| 3,420,676 | 1/1969 | Keitel . |
| 3,891,771 | 6/1975 | Green et al. ............ 426/52 |
| 4,342,786 | 8/1982 | Raccach ............... 426/52 |
| 4,842,871 | 6/1989 | Hill ..................... 426/44 |

FOREIGN PATENT DOCUMENTS

| | | |
|---|---|---|
| 0368603A2 | 5/1990 | European Pat. Off. . |
| 0378012 | 7/1990 | European Pat. Off. . |
| 1374435 | 8/1964 | France . |
| 1239765 | 7/1971 | United Kingdom ........ 426/49 |
| 2098850 | 5/1982 | United Kingdom . |

OTHER PUBLICATIONS

Derwent File Supplier JAPS, Patent Office of Japan, re: Japanese Application 55081541, (1980).
Derwent File Supplier WPI(L), (1982) Acession No. 82-08808E, re: Japanese Application 56164742 (1981).
Derwent File Supplier JAPS, Patent Office of Japan, re: Japanese Application 60 207561, (1985).
Derwent Patent Office of Japan, re: Japanese Application 62 282576, (1986).

*Primary Examiner*—Joseph Golian
*Assistant Examiner*—Leslie Wong
*Attorney, Agent, or Firm*—Vogt & O'Donnell

[57] ABSTRACT

Vegetables and fruits are heat-treated to blanch them and then cooled. The heat-treated vegetables are fermented with a lactic bacteria in the presence of water to obtain a fermented food and water of fermentation having a pH of from 3.1 to 4.4. The water of fermentation is drained from the fermented food, which then is washed. The fermented food, at a pH of from 3.8 to 4.4, then is pasteurized.

12 Claims, No Drawings

PRESERVATION OF VEGETABLES AND FRUITS

BACKGROUND OF THE INVENTION

The invention relates to a process for the production of a long-life food product comprising at least one vegetable and/or at least one fruit and to a food product obtained by this process.

Conventional methods for preserving food products, such as vegetables, include, in particular, sterilization in cans, acidification in brine or immersion in vinegar or oil for example. The traditional products obtained by these processes include, in particular, vegetables, such as socalled tinned green peas and carrots, sauerkraut or stewed turnips, condiments such as gherkins or onions in vinegar and mushrooms or artichoke hearts in oil for example.

To prevent the organoleptic and/or physical properties of food products from deteriorating by sterilization of the food products by prolonged heat treatment at temperatures above 100° C. or by addition of preservatives, such as salt, acetic acid or benzoic acid, Great Britain Patent Specification No. 1,239,765 proposes a process in which a ferment of lactic bacteria is applied to the inner surface of a glass container, a food product is heat-treated at 60° to 120° C. and is then introduced into the container at that temperature, the container is sealed and rapidly cooled to a fermentation temperature, incubated for the time necessary for fermentation to take place and then cooled to ambient temperature. This process is difficult to control and vegetables thus prepared have an acidic flavour.

According to U.S. Pat. No. 3,891,771, fermented vegetables of the vegetables-in-brine type, better known in English as "pickles", are prepared by rapid fermentation which eliminates the need to use a brine. The pickles thus obtained have an adequate flavour, colour and texture and may be used as condiments.

According to European Patent Application Publication No. 368 603, food products, particularly fillings based on meat and cheese for flaky pastry which keep for long periods at ambient temperature, are prepared by heat treatment at a temperature above 70° C., pH adjustment to 4.3–5.4, more particularly by addition of lactic acid, adjustment of their water activity to a value of preferably below 0.92 and packing in an inert atmosphere in sealed packs.

SUMMARY OF THE INVENTION

The problem addressed by the present invention was to provide a process for the production of a long-life food product consisting mainly of a vegetable and/or a fruit and/or a mixture of vegetables and/or fruits which would be comparable in flavour, colour and texture with the same fresh vegetables and/or fruits prepared in the kitchen, for example with steam or in boiling water.

To this end, the process according to the invention for the production of a long-life food product comprises the steps of
  i) heat-treating at least one vegetable and/or at least one fruit for 1 to 15 mins. at 80° to 95° C.;
  ii) cooling and fermentation with a lactic bacterium in the presence of water for 10 h to 3 d at 15° to 45° C. to a pH value of 3.1 to 4.4;
  iii) draining the water of fermentation from the fermented food;
  iv) washing the fermented food with water to remove water of fermentation from the fermented food and if the washed food does not have a pH of from 3.8 to 4.4, adjusting the pH of the washed food to a pH of from 3.8 to 4.4; and
  v) a pH value of 3.1 to 4.4, pasteurization for 2 to 30 mins. at 80° to 110° C.

It has surprisingly been found that it is possible by this process to prepare a vegetable and/or a fruit or a mixture of vegetables and/or fruits having the desired qualities, namely a crispy texture which may be adjusted as required, whereas it would be destroyed by traditional sterilization, the colour of a fresh product prepared in the kitchen and an agreeable flavour in which there is no trace of acidity.

DETAILED DESCRIPTION OF THE INVENTION

The process according to the invention may be carried out using any edible vegetable whether in the form of seeds, roots, tubers, stems, leaves, flowers or fruits for example. It is also possible to use certain edible fruits, which are distinguished from vegetables by their high sugar content, providing they are of suitable texture. Finally, it is possible to use any edible mushrooms, more particularly any cultured mushrooms such as, for example, *Agaricus bisporous, Pleurotus ostreatus* or *Lentinus edodes*. To simplify the present specification, the edible mushrooms may be considered as vegetables.

The vegetable and/or the fruit is preferably cut into pieces if it is relatively large in size. For example, carrots may be cut into slices, potatoes into sticks, celery into dice or pears into strips, whereas cabbage, onions or mushrooms may be sliced.

After the vegetable and/or the fruit has been washed, prepared and, if necessary, cut into pieces, it is heat-treated for 1 to 15 minutes at 80° to 95° C., a residence time at the lower end of the range in question preferably corresponding to a temperature situated at the upper end of the range in question and vice versa. The heat treatment may be carried out, for example, by immersion in water heated to that temperature or by heating with steam or microwaves.

If the vegetable and/or the fruit is heat-treated for less than one minute or at a temperature below 80° C., there is a danger that enzymes, such as peroxidase or pectin esterase for example, might not be sufficiently destroyed or inactivated, resulting in a modification, particularly softening, of the texture of the vegetable and/or fruit. If the vegetable and/or the fruit is heat-treated for more than 15 minutes or at a temperature above 95° C., there is a danger than the desired crispy texture might not be preserved.

The vegetable and/or the fruit is then cooled, preferably directly, to the fermentation temperature and is then subjected to fermentation with a lactic bacterium in the presence of water for 10 h to 3 d at approximately 15° to 45° C. to a pH value of 3.1 to 4.4. The lactic bacterium, in other words a bacterium producing lactic acid, may be selected from the commercial strains commonly used in the production of fermented products, such as salami or sauerkraut for example. More particularly, a strain of *Lactobacillus, plantarum, Leuconostoc mesenteroides* or *Lactobacillus brevis*, may be used as the lactic bacterium and fermentation may be carried out, for example, at a temperature of approximately 20° to 35° C.

The cooling and fermentation steps may be carried out, for example, by immersing the vegetable and/or the fruit in water heated to the desired fermentation temperature, inoculating it with a ferment of the bacterium selected and leaving it to ferment. Fermentation is preferably carried out in the presence of at least such a quantity of water that the vegetable and/or the fruit is completely covered, more particularly in a quantity of water equivalent to approximately 0.8 to 4 times the volume of the vegetable and/or the fruit. Up to about 2% sodium chloride and, particularly where a vegetable is relatively poor in fermentable sugar, up to about 2% sucrose, glucose or fructose, for example, may be added to the water before fermentation.

If fermentation is carried at a temperature below 15° C. or for less than 10 h, there is a danger of the desired acidification might not be obtained, the bacterium not being sufficiently active for a long enough time.

If fermentation is carried out at a temperature above 40° C. or for more than 3 days, there is a danger that the desired fermentation might not be obtained and the action of unwanted microorganisms or enzymes might be promoted.

So far as the pH range is concerned, the lower limit of 3.1 corresponds to a value below which the lactic bacteria are virtually inactive. By contrast, if fermentation, i.e., acidification, is not allowed to continue to at least pH 4.4, there is a danger that the conditions required for inhibition of the spores of sporulating microorganisms might not be established, even in the event of subsequent pasteurization.

In a first preferred embodiment of the process according to the invention, the vegetable and/or the fruit obtained in the fermentation step ii) is washed and, at the same time, if the washed food is not a pH of from 3.8 to 4.4, it is adjusted to pH 3.8–4.4, drained, packed in portion packs and subjected to the pasteurization of step iii) after packing. This first embodiment is particularly suitable for the production of a long-life food product comprising a single vegetable and/or fruit.

In a second preferred embodiment of the process according to the invention, the vegetable and/or the fruit is subjected to the pasteurization of step iii) with at least part of the water of fermentation obtained in step ii) and is then aseptically packed in sterile storage packs with at least part of that water. This second embodiment is particularly advantageous for the production of a longlife food product comprising at least two vegetables and/or fruits.

Thus, at least two different vegetables and/or fruits may be separately subjected to the heat treatment, fermentation and pasteurization of steps i) to iii), each of the vegetables and/or fruits obtained in step iii) may be aseptically packed in sterile storage packs with at least part of its water of fermentation, at least two vegetables and/or fruits may be simultaneously removed from their respective storage packs, washed and if not at a pH at from 3.8 to 4.4, adjusted to pH 3.8–4.4, drained and mixed, the mixture subsequently packed in portion packs and pasteurized for 2 to 30 minutes at 80° to 110° C., a residence time at the lower end of the range in question preferably corresponding to a temperature at the upper end of the range in question and vice versa.

In a third preferred embodiment of the process according to the invention, the vegetable and/or the fruit obtained in fermentation step ii) is washed and if not at a pH of from 3.8 to 4.4, adjusted to pH 3.8–4.4, subjected to the pasteurization of step iii) and aseptically packed in sterile storage packs. This third embodiment is also suitable for the production of a long-life food product comprising at least two vegetables and/or fruits.

Thus, at least two different vegetable and/or fruits may be separately subjected to the heat treatment, fermentation and pasteurization of steps i) to iii), each of the two vegetables and/or fruits obtained in step iii) may be aseptically packed in a sterile storage pack, at least two vegetables and/or fruits may be simultaneously removed from their respective storage packs, drained and mixed, the mixture may be packed in portion packs and then pasteurized for 2 to 30 minutes at 80 to 110° C., a residence time at the lower end of the range in question preferably corresponding to a temperature at the upper range in question and vice versa.

In the second preferred embodiment described above, the water of fermentation serves as the storage medium whereas, in the third preferred embodiment described above, the storage medium is the water in which the vegetable and/or fruit is kept after washing and of which the pH if not at a pH of from 3.8 to 4.4, has thus been adjusted to 3.8–4.4. In these two embodiments, the vegetable and/or fruit is preferably packed in sterile packs with a quantity of water equivalent to approximately 0.5 to 2 times its volume.

Accordingly, the second and third preferred embodiments lend themselves with advantage to the production of a long-life food product comprising at least two vegetables and/or fruits, particularly vegetables and/or fruits which do not necessarily grow in the same place or in the same season. Accordingly, each may be packed in a sterile storage pack after it has been freshly picked and mixing may then be carried out later in the year.

In the three preferred embodiments of the process according to the invention described above, the vegetable(s) and/or fruit(s) is/are thus subjected to washing and, if necessary, with pH adjustment to 3.8–4.4 either before packing in sterile storage packs or before draining and packing in portion packs. The object of the washing step is, on the one hand, to eliminate the water of fermentation which may have a particular flavour and, on the other hand, to adjust the pH to a standard value which it is desired to maintain in the end product. If the pH is adjusted to a value below 3.8, the vegetable(s) and/or fruit(s) is/are in danger of having an overly pronounced acidic flavour. If the pH is adjusted to a value above 4.4, there is a danger than the conditions required for inhibition of the spores of sporulating microorganisms and inactivation of the vegetative cells might not be established, even in the event of subsequent pasteurization. The pH adjustment may be carried out, for example, by simple contact of the washing water with the vegetable(s) and/or fruit(s) and/or by addition of a neutralizing agent, such as sodium hydroxide.

The process according to the invention thus comprises a pasteurization step iii) which is carried out for 2 to 30 mins. at a temperature of 80° to 110° C. In the first preferred embodiment described above, this step is carried out directly on the packed vegetable and/or fruit in its final portion pack. In the second and third preferred embodiments described above, the pasteurization step is carried out on each vegetable and/or fruit before it is aseptically packed in sterile storage packs. It is preferably carried out continuously on a pumpable mixture of the vegetable and/or fruit and its water of fermentation or the water in which it is kept after washing and pH adjustment, this mixture comprising a quantity of water equivalent to approximately 0.8 to 4 times the volume of the vegetable and/or fruit. Accordingly, these two embodiments comprise a second pasteurization step which is carried out for 2 to 30 mins. at 80° to 110° C. on the end product, namely a mixture of at least two vegetables and/or fruits in its final portion pack.

If the pasteurization step(s) is carried out for less than 2 minutes or at a temperature below 80° C., there is a danger that the conditions required for inhibition of the spores of sporulating microorganisms and for inactivation of vegetative cells might not be established, even if acidification has previously been carried out. If the pasteurization step(s) is carried out for more than 30 minutes or at a temperature above 110° C., the texture of the vegetable(s) and/or fruit(s) is in danger of being softened so that it is no longer comparable with that of the same vegetable(s) and/or fruit(s) prepared in the kitchen, for example with steam or in boiling water.

In the context of the invention, a suitable sterile storage pack may be made, for example, in the form of a bag of a plastics material or a composite film sterilizable with steam or by irradiation. Similarly, a portion pack may be made in the form of a bag or container of a plastics material or a composite film or in the form of a glass jar, for example, having suitable hermetic sealing or closure means.

EXAMPLES

The following Examples are intended to illustrate the process and the product according to the invention. In the Examples, percentages and parts are by weight, unless otherwise indicated.

EXAMPLE 1

Cauliflowers are prepared and cut into pieces of which the largest is approximately 1-2 cm in size. The pieces of cauliflower are then blanched for 2 minutes in water at 90° C.

They are then cooled to approximately 30° to 35° C. by immersion in their equivalent by volume of water containing 20 g sodium chloride and 0.5% glucose per liter. The mixture of water and cauliflower is inoculated with a commercially available ferment of *Lactobacillus plantarum* and then left to ferment for about 24 h at approximately 32°-35° C. to a pH value of 3.4.

The cauliflowers are drained, washed liberally with water and then left standing for 30 minutes in their equivalent by volume of water, after which the mixture of cauliflower and water has a pH of approx. 4.0. The cauliflowers are drained, packed in plastic portion containers with heat-sealed lids and pasteurized therein for 10 mins. at 90° C.

Some of the containers are opened just after pasteurization. The product obtained is found to have a crispy texture and an agreeable flavour and a white colour. By opening some of the containers at regular intervals, the product is found to have lost virtually none of these qualities after storage for several months or even one year at ambient temperature.

EXAMPLE 2

Carrots are prepared and cut into slices 2 to 3 mm thick. They are blanched for 1 minute in water at 95° C. They are then cooled to approximately 25° C. by immersion in a quantity of water equivalent to approximately 0.8 to 1 times their volume. They are then inoculated with a commercially available ferment of *Lactobacillus plantarum* and left to ferment at ambient temperature for 2 d to a pH value of 3.6.

The carrots are drained, washed liberally with water and then left standing in their equivalent by volume of water for approximately 1 h, after which the mixture of carrots and water has a pH of approximately 4.2. The mixture is continuously pasteurized for 3 mins. at 90° C. and then aseptically packed in sterile, heat-sealed plastic storage bags.

The product thus produced and packed keeps for several months and may be eaten as such after draining or in the form of a mixture with other vegetables and/or fruits, for example after draining and repacking in portion packs. It has a crispy texture, a red-orange colour and an agreeable flavour.

EXAMPLE 3

A long-life product is produced in the same way as described in Example 2, except that the carrots are not washed after fermentation, but instead are directly pasteurized with their water of fermentation before being aseptically packed in heat-sealed sterile plastic storage bags.

The product thus prepared and packed keeps for several months and may be eaten as such after draining, although it does have a somewhat particular flavour, or in the form of a mixture with other vegetables and/or fruits, for example after washing, draining and repacking in portion packs.

EXAMPLE 4

Various vegetables and/or fruits are produced in the same way as described in Example 2 and various mixtures thereof are prepared and then packed and pasteurized in heat sealed transparent plastic bags. The conditions under which these vegetables and/or fruits and their mixtures are produced are shown in the following Table:

| Vegetable and/or fruit | Blanching | Fermentation Temp. | Time | To pH | pH after washing | First pasteurization | Mixture (proportion) | Second pasteurization |
|---|---|---|---|---|---|---|---|---|
| Onions | 1 min./90° C. | 22-25° C. | 36-40 h | 3.6-3.8 | 4.2 | 3 min./90° C. | 25% | 10 min./90° C. |
| Red peppers | 1 min./90° C. | 22-25° C. | 30-36 h | 3.6-3.8 | 4.2 | 3 min./90° C. | 25% | 10 min./90° C. |
| Cauliflowers* | 2 mins./90° C. | 22-25° C. | 40-48 h | 3.6-3.8 | 4.2 | 3 min./90° C. | 25% | 10 min./90° C. |
| Carrots | 4 mins./90° C. | 22-25° C. | 40-48 h | 3.6-3.8 | 4.2 | 3 min./90° C. | 25% | 10 min./90° C. |

*0.25% glucose was added to the water in which the vegetable is fermented

The product thus produced and packed keeps for several months and may be eaten as such. Each of the four vegetables and/or fruits has a crispy texture, the colour of the fresh product after cooking and an agreeable authentic flavour.

EXAMPLE 5

Various vegetables and/or fruits are produced in the same way as described in Example 3 and, after draining and washing, various mixtures thereof are prepared and are then packed and pasteurized in heat-sealed transparent plastic bags. The conditions under which the vegetables and/or fruits and their mixtures are prepared are shown in the following Table.

| Vegetable and/or fruit | Blanching | Fermentation Temp. | Time | To pH | pH after washing | First pasteurization | Mixture (proportion) | Second pasteurization |
|---|---|---|---|---|---|---|---|---|
| Carrots | 4 min./90° C. | 30–32° C. | 18–22 h | 3.8–4.0 | 4.0–4.4 | 3 min./90° C. | 20% | 10 min./90° C. |
| Potatoes* | 3 min./90° C. | 30–32° C. | 20–24 h | 3.8–4.0 | 4.0–4.4 | 3 min./90° C. | 20% | 10 min./90° C. |
| Paris Mushrooms (*Agaricus bisporus*)* | 1 min./90° C. | 30–32° C. | 20–24 h | 3.8–4.0 | 4.0–4.4 | 3 min./90° C. | 20% | 10 min./90° C. |
| Courgettes | 1 min./90° C. | 30–32° C. | 20–24 h | 3.8–4.0 | 4.0–4.4 | 3 min./90° C. | 20% | 10 min./90° C. |
| Yellow peppers | 30 s/90° C. | 30–32° C. | 14–18 h | 3.8–4.0 | 4.0–4.4 | 3 min./90° C. | 20% | 10 min./90° C. |

*0.25% glucose was added to the water in which each of these vegetable is fermented The product thus produced and packed keeps for several months and may be eaten as such. Each of the five vegetables and/or fruits has a crispy texture, the colour of the fresh product after cooking and an agreeable authentic flavour.

We claim:

1. A process for preserving foods comprising:
   heat-treating at least one food selected from the group of foods consisting of vegetables and fruits for from 1 minute to 15 minutes at a temperature of from 80° to 95° C. and then cooling the heat-treated food;
   fermenting the cooled heat-treated food with a lactic bacterium in the presence of water for from 10 hours to 3 days at a temperature of from 15° C. to 45° C. to obtain a fermented food and a water of fermentation having a pH of from 3.1 to 4.4;
   draining the water of fermentation from fermented food;
   washing the fermented food with water to remove water of fermentation from the food, and if the pH of the washed food is not at a pH of from 3.8 to 4.4, adjusting the pH of the washed food to a pH of from 3.8 to 4.4; and
   pasteurizing the washed food having a pH of from 3.8 to 4.4 for from 2 minutes to 30 minutes at a temperature of from 80° C. to 110° C. to obtain a pasteurized food.

2. A process according to claim 1 further comprising, after fermenting the cooled heated-treated food and before draining, first pasteurizing the fermented food with at least a part of the water of fermentation for from 2 mintues to 30 minutes at a temperature of from 80° C. to 110° C., aspectically packing the first pasteurized food and water in a sterile pack, subsequently opening the packs and removing the food from the packs and then draining, washing and pasteurizing the first pasteurized food.

3. A process according to claim 1, wherein prior to pasteurizing the fermented washed food, further comprising packing portions of the food in packs and then pasteurizing the fermented food in the packs.

4. A process according to claim 1 further comprising aspectically packaging the pasteurized food in sterile packs.

5. A process according the claim 4 wherein at least two different foods are separately heat-treated, cooled, pasteurized and packed with water and further comprising removing the packed foods from the packs, draining water from the foods, mixing the drained foods to obtain a mixture of foods, packing the food mixture in a pack and then pasteurizing the mixture of packed foods for from 2 minutes to 30 minutes at a temperature of from 80° to 110° C.

6. A process according to claim 2 wherein at least two different foods are separately heat-treated, cooled, pasteurized and packed with water and removed from the packs and drained and further comprising mixing the drained foods to obtain a mixture of foods, and then packing the food mixture in a pack and then pasteurizing the mixture of packed foods.

7. A process according to claim 1 wherein the food is fermented in a quantity of water in an amount of from 0.8 to 4 times the volume of the food.

8. A process according to claim 1 wherein the food is pasteurized with a quantity of water in an amount of from 0.8 to 4 times the volume of the food.

9. A process according to claim 2 wherein the food is pasteurized with a quantity of water in an amount of from 0.8 to 4 times the volume of the food.

10. A process according to claim 5 wherein the food is packed with a quantity of water in an amount of from 0.5 to 2 times the volume of the food.

11. A process according to claim 6 wherein the food is packed with a quantity of water in an amount of from 0.5 to 2 times the volume of the food.

12. A process according to claim 1 wherein the lactic bacteria are selected from the group of bacteria consisting of *Lactobacillus plantarum, Leuconostoc mesenteroides* and *Lactobacillus brevis*.

* * * * *

UNITED STATES PATENT AND TRADEMARK OFFICE
CERTIFICATE OF CORRECTION

PATENT NO. : 5,192,565
DATED : March 9, 1993
INVENTOR(S) : Marcel BUHLER, et al.

It is certified that error appears in the above-identified patent and that said Letters Patent is hereby corrected as shown below:

Column 2, line 4, delete "a pH value of 3.1 to 4.4,".

Signed and Sealed this

Twenty-third Day of November, 1993

Attest:

BRUCE LEHMAN

*Attesting Officer*  *Commissioner of Patents and Trademarks*